Aug. 11, 1925.
A. ROHRBACH
AIRPLANE WING
Filed June 10, 1924
1,549,687
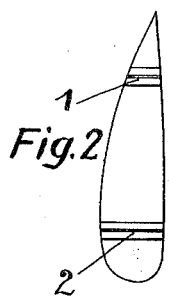
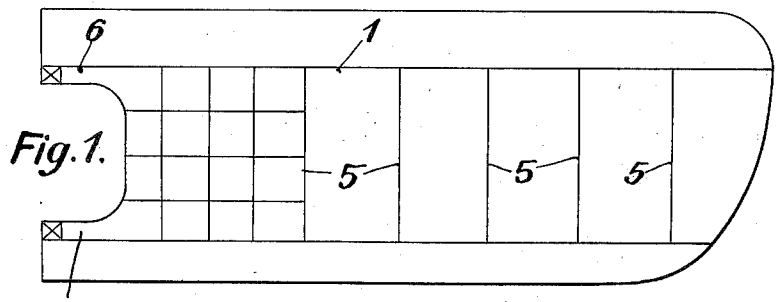
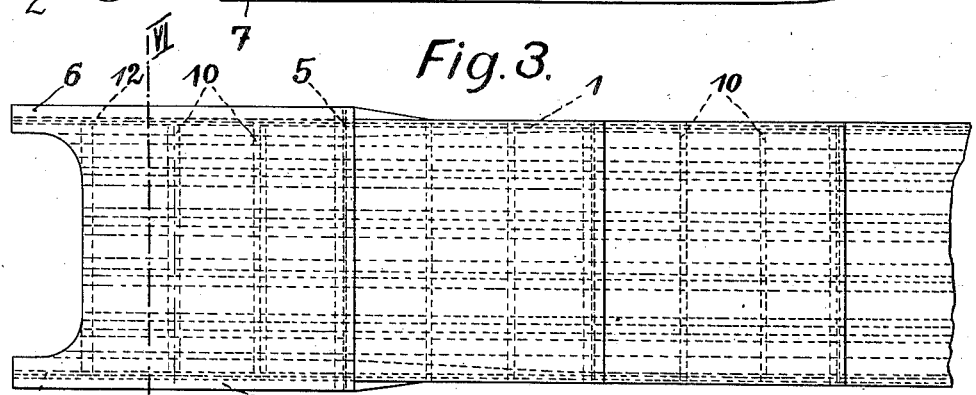
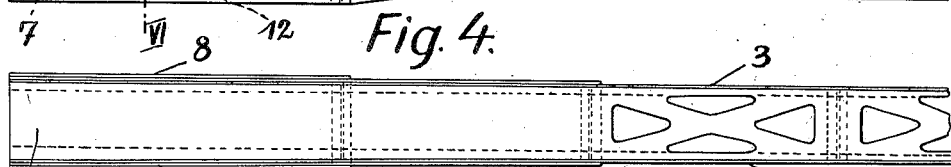
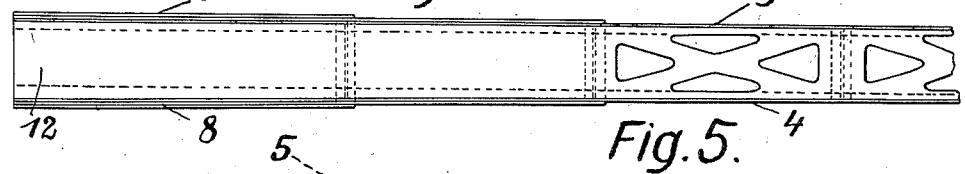
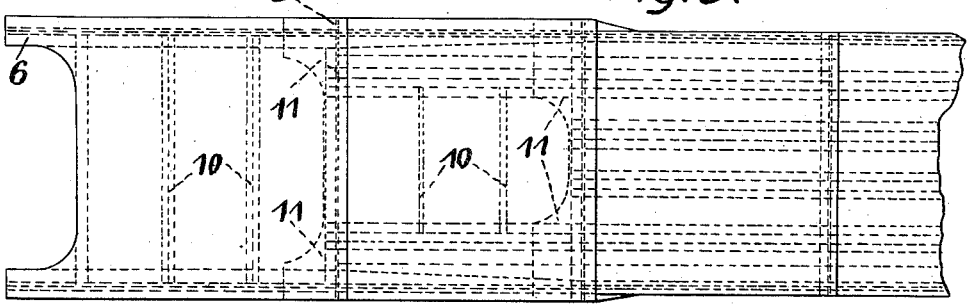
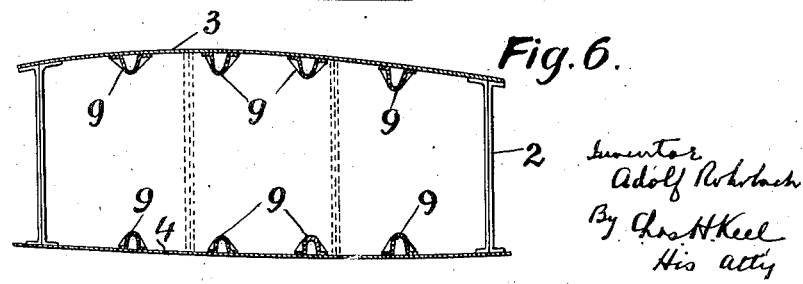

Patented Aug. 11, 1925.

1,549,687

UNITED STATES PATENT OFFICE.

ADOLF ROHRBACH, OF BERLIN-WILMERSDORF, GERMANY.

AIRPLANE WING.

Application filed June 10, 1924. Serial No. 719,103.

*To all whom it may concern:*

Be it known that I, ADOLF ROHRBACH, a citizen of Germany, and residing at Ruhrstrasse 12, Berlin-Wilmersdorf, Germany, have invented an Improvement in Airplane Wings, of which the following is a specification.

This invention consists in an aircraft-wing constructed either partly or else entirely as hollow box-frame with stressed skin. The connection of such aircraft-wings to the fuselage or the boat or else the reciprocal connection of the two wing-parts presents many difficulties. These difficulties may be avoided by constructing the wings of one piece which pass uninterruptedly through the fuselage, but such construction, however, renders transportation of large planes on carriages or ships so difficult, at the same time making assembly so hard a task, that it seemed a matter of importance to abandon the one-piece-construction.

The wing-connection or construction described in this application, absolutely avoids the above difficulties and assures a solid and reliable joint with the proper distribution of forces throughout the wing. The wing-frame terminates at the base into two wooden stumps, which form the prolongation of its front and rear girders. Fittings, shackles or the like may be connected to these stumps in a solid and rigid manner. It stands to reason that for a wing of such design a connecting-piece has to be built, strong enough to take up and transmit the force acting on the wing. Avoiding any local stress on the connecting-parts the forces in question must be transmitted gradually from the connecting stumps to the wing. The most efficient means to reach this purpose was a fan-like distribution of the forces on the stressed skin on the upper and under side of the wing.

An embodiment of my invention is shown, by way of example, on the accompanying drawings, wherein:—

Fig. 1, diagrammatical illustration of the wing.

Fig. 2, side elevation of the wing.

Fig. 3, connecting-part of one wing (larger scale).

Fig. 4, side elevation of box-partition.

Fig. 5, another type of connecting-part.

Fig. 6, section of the wing, running along VI—VI in Fig. 3.

A box consisting of two partitions 1 and 2, upper and lower sheet-metal skins 3 and 4, and intermediate walls 5 forms the principal structural frame member of the wing, at the same time carrying the wing-connection. The intermediate partitions 5 reappear at certain distances towards the wing-tip. Near the wing-base or end connections 6, 7 the hollow box is strengthened by means of intermediate pieces 8, so that all stresses are transmitted with sufficient reliability to the two stumps.

The reinforcement of the wing-base is obtained by doubling the skins or else by riveting, gluing or screwing shackles, connecting-plates or the like to same. This form of reinforcement, carried through with perfect uniformity and to the limit, would cause a considerable increase of weight, and accordingly I prefer to correlate therewith another means of reinforcement which supplements and functions with the first form of reinforcement in forming a wing of the desired strength and lightness in weight throughout. Therefore stiffening-ribs 9 are provided at the inside of the skin, which, at the same time, are intended to counteract any deformation of the skin and to guard the profile, when weight or stress are acting at the wing. These longitudinal ribs are connected by transverse ones 10. According to the forces to be transmitted towards the wing-base the lightening-holes in the box-partitions have to be enlarged gradually towards the wing-tips.

If, in special cases, it seems desirable to make particular arrangements for the sub-division of the hollow box, constructing same as post-bag, petrol-tank or the like, the wing is built according to Fig. 5. To this end the stiffening-ribs 9 do not run through to the wing-base, but are connected with strengthening-members 11, which, in their turn, transmit the forces to the box-walls, considerably reinforced from here, and, by means of these walls and the strengthening-members 12, to the connection 6, 7. The central parts of the sub-divisions are thus free to be employed according to the requirements. This case allows the transverse walls to be built out solidly, so that they may be used as closed tanks.

Such stiffening causes a uniform transmission of the stresses over the surface of the box-frame, allowing them to run out gradually towards the connections 6 and 7.

The connections or spar-stumps 6 and 7 are then joined to the reverse stumps or the fuselage by means of standard fittings.

Claims:

1. An airplane wing structure including longitudinal and transverse frame members forming a box frame with stressed skins joined thereto, said longitudinal members terminating in end connections, and reinforcing and force distributing members interposed between and joining the end connections and the box frame.

2. An airplane wing structure including longitudinal and transverse frame members forming a box frame with stressed metallic skins joined thereto, said longitudinal members terminating in end connections and having reinforcing members interposed therebetween and the box frame, and reinforcing and force distributing plates superposed upon the said stressed metallic skins in the vicinity of said reinforcing members and functioning to both reinforce the base and to distribute the forces uniformly throughout the wing.

3. An airplane wing structure including longitudinal and transverse frame members forming a box frame, said longitudinal members terminating in end connections, a stressed metallic skin firmly secured to said box frame throughout the length of the wing and including a double layer of the metallic skin adjacent the end connections with only a single layer adjacent the tip end of the wing for the purpose set forth.

4. An airplane wing structure including longitudinal and transverse frame members forming a box frame, said longitudinal members terminating in end connections, a stressed metallic skin firmly secured to the upper and lower parts of said box frame and said metallic skin having longitudinal reinforcing members secured to the inside surface thereof.

5. An airplane wing structure of the character set forth in claim 4 wherein a portion of the wing in the neighborhood of the end connections is reinforced by a double layer of stressed skin which functions to both reinforce the wing base and to distribute the forces between the end connections and the box frame or body part of the wing.

6. An airplane wing structure of the character set forth in claim 4 wherein the longitudinal strengthening members on the inside surface of the stressed metallic skin are discontinued at points removed from the end connections, and reinforcing plate members rigidly joined to said longitudinal reinforcing members, said plate members being in turn joined to the longitudinal frame members extending to the end connections.

7. An airplane wing structure of the character set forth in claim 4 wherein the longitudinal reinforcing members on the inside of the stressed metallic skin extend throughout the length of the wing.

8. An airplane wing structure of the character set forth in claim 4 wherein transverse force distributing and reinforcing ribs are secured to the inside of the stressed metallic skin and are joined to the longitudinal reinforcing members.

9. An airplane wing structure including a skeleton box-like frame having its main body formed entirely of thin web-like longitudinal and transverse members, a stressed metallic skin firmly secured about the upper and lower sides of the skeleton box-like frame and capable of transmitting and withstanding the forces to which the wing is subjected, and reinforcing and strain distributing members interposed between the wing root, the skeleton frame and the stressed skin to provide for the distribution of the forces through the wing and transmission through the wing connections.

In testimony whereof, I have signed my name to this specification.

ADOLF ROHRBACH.